US005785295A

United States Patent [19]

Tsai

[11] Patent Number: 5,785,295

[45] Date of Patent: Jul. 28, 1998

[54] THERMALLY BUCKLING CONTROL MICROVALVE

[75] Inventor: Ming-Jye Tsai, Chang Hua, Taiwan

[73] Assignee: Industrial Technology Research Institute, Hsinchu, Taiwan

[21] Appl. No.: 703,490

[22] Filed: Aug. 27, 1996

[51] Int. Cl.[6] .......... F16K 31/00

[52] U.S. Cl. .......... 251/11; 251/129.01; 251/129.06; 251/331

[58] Field of Search .......... 251/331, 129.01, 251/129.06, 11, 129.08

[56] References Cited

U.S. PATENT DOCUMENTS

| | | | |
|---|---|---|---|
| 4,581,624 | 4/1986 | O'Connor | 251/129.06 |
| 5,029,805 | 7/1991 | Albarda | 251/129.06 |
| 5,058,856 | 10/1991 | Gordon | 251/11 |
| 5,069,419 | 12/1991 | Jerman | 251/11 |
| 5,161,774 | 11/1992 | Englesdorf | 251/11 |
| 5,238,223 | 8/1993 | Mettner | 251/129.06 |
| 5,323,999 | 6/1994 | Bonne | 251/331 |
| 5,333,831 | 8/1994 | Barth | 251/11 |

OTHER PUBLICATIONS

Shoji et al., Microflow devices and systems, Micromech. Microeng. 4 (1994), pp. 157–171.

Esashi, Integrated Micro Flow Control Systems, Sensors and Actuators, A21–A23 (1990), pp. 161–167.

Lisec et al., Thermally Driven Microvalve with Buckling Behaviour for Pneumatic Applications, 0–7803–1833–1.94, IEEE, pp. 13–17.

*Primary Examiner*—Denise L. Ferensic
*Assistant Examiner*—Ramyar Farid
*Attorney, Agent, or Firm*—Pollock, Vande Sande & Priddy

[57] ABSTRACT

A thermally buckling control microvalve including three layers in which the intermediate layer is an electrically conductive one. The left side of the intermediate layer that aligns with an outlet of the lower layer has a suspension supported on both sides by a thin bridge structure. An upper side of the suspension is provided with an electrical thermal membrane which slightly curves upwardly, and a valve nozzle communicating with the outlet of the lower layer is caused to gradually open when actuated. A pressure chamber is disposed above the suspension and the bridge structures and a pressure distribution chamber communicating with the pressure chamber is disposed below. The area of the pressure chamber in contact with the suspension and the bridge structures is greater than that of the pressure distribution chamber in contact with the suspension and the bridge structures, causing the bottom rim of the suspension to always lie against the valve nozzle, preventing leakage of fluid from the pressure distribution chamber.

12 Claims, 9 Drawing Sheets

THERMALLY BUCKLING CONTROL MICROVALVE

BACKGROUND OF THE INVENTION

1. Field of the Invention

The present invention relates generally to a control valve structure, and more particularly to a thermally buckling control microvalve structure.

2. Description of the Prior Art

For the principles and characteristics of all kinds of microvalves, the discussion in "Microflow devices and systems" at pages 157–171 of the April 1994 issue of the periodical Micromech. Microeng. published by IOP Publishing Ltd. of the United Kingdom is most thorough. It introduces various kinds of control microvalves, including electrostatically actuated microvalves, electromagnetically driven microvalves and bimetallic type microvalves.

Methods of making an electrostatically actuated microvalve have been disclosed in U.S. Pat. No. 5,142,781 and U.S. Pat. No. 5,180,623 issued, respectively, in 1992 and 1993. In view of the principle that the electrostatically generated force increases inversely with the square of the separation distance, the distance between two adjacent electrodes has to be very short and the space within the valve is therefore limited, so that it is not possible to provide a flow control with linear characteristics.

As for microvalves fabricated using piezoelectric actuators of various materials, the paper on "Integrated Micro Flow Control Systems" by Masayosi Esashi in Sensors and Actuators, A21–A23 (1990), pages 161–167, gives an extensive and in-depth introduction. As piezoelectrically actuated microvalves require over 100 volts of voltage to control and drive them, the difficulty of microcontrol is increased.

U.S. Pat. No. 5,058,856 to Gordan et al. teaches a thermally-actuated microminiature valve using bimetallic technology. U.S. Pat. No. 5,271,597 also discloses a similar valve. Although the process of fabricating a bimetallic type microvalve is relatively simple and easy, the expansion coefficient between the two metallic elements of the diaphragm is very great and may easily result in damage, hence the life of such type of microvalve is very short.

In addition to the microvalves described above, there is a kind of microvalve employing a thermal driving principle using the buckling effect of a microbridge, as described in a paper entitled 'Thermally Driven Microvalve with Buckling Behaviour for Pneumatic Applications" by T. Lisec et al. in IEEE (1994). Although microvalves using the thermally buckling control principle may be driven by a voltage less than 10 volts, the temperature of the diaphragm must be raised to a certain level in order to open the valve by sudden deflection. It can therefore be seen that the opening or closure of the valve occurs in an abrupt manner, unable to achieve linearities to control the flow. Another disadvantage is that such valves cannot withstand very high gaseous pressure.

For applications relating to microvalve mechanisms such as micropumps and silicious microvalves, reference can be made to U.S. Pat. No. 5,259,737 and 5,329,713 issued in 1993 and 1995, respectively.

SUMMARY OF THE INVENTION

Accordingly, a primary object of the present invention is to provide a microvalve which is easy to manufacture, requires less driving voltage, and the flow through which may be controlled to have linear characteristics.

Another object of the present invention is to provide a thermally buckling control microvalve which may not only improve on the drawback of the sudden opening/closing of the prior art so as to control the flow path in the valve to achieve linearities, but which also bears a greater fluid pressure.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
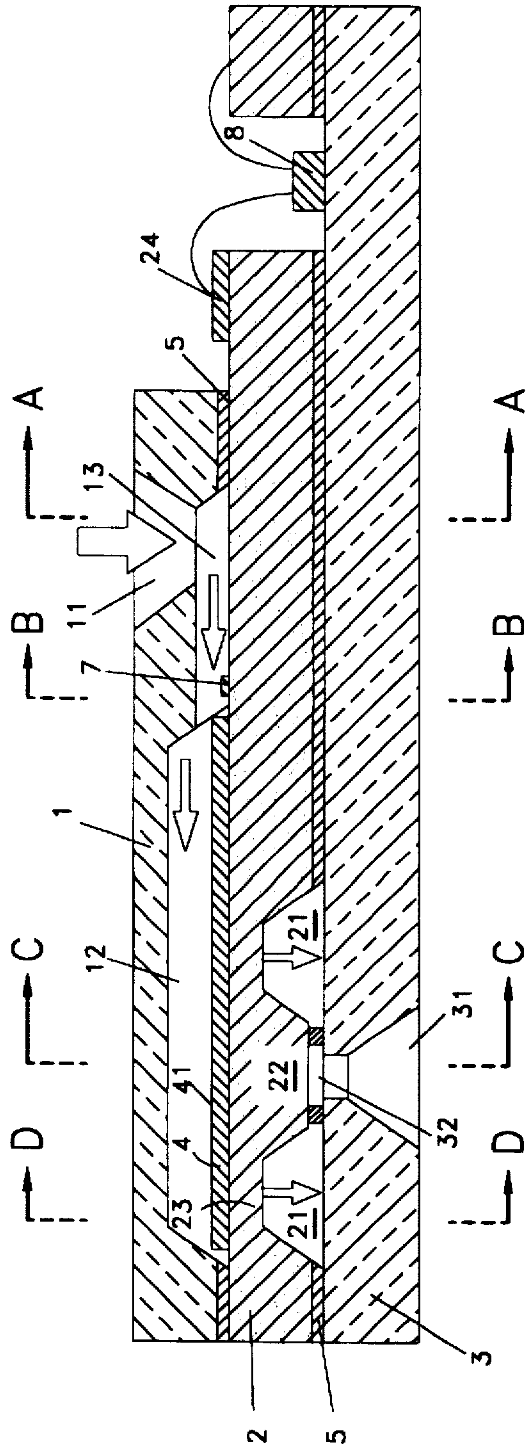
FIG. 1 is a sectional view of a first preferred embodiment of the microvalve of the present invention.
Figure 1A:
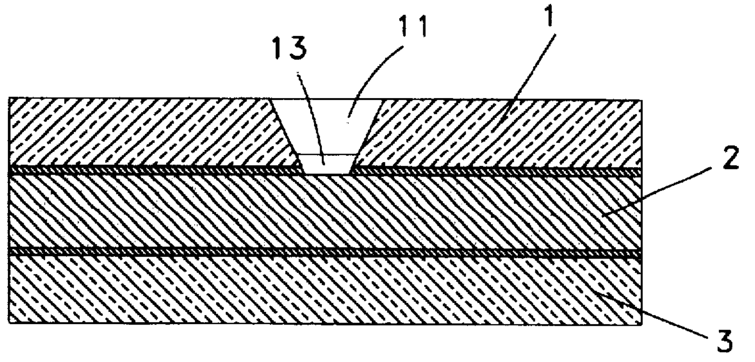
FIGS. 1A, 1B, 1C and 1D are sectional views respectively taken along lines A—A, B—B, C—C and D—D of FIG. 1.
Figure 1B:
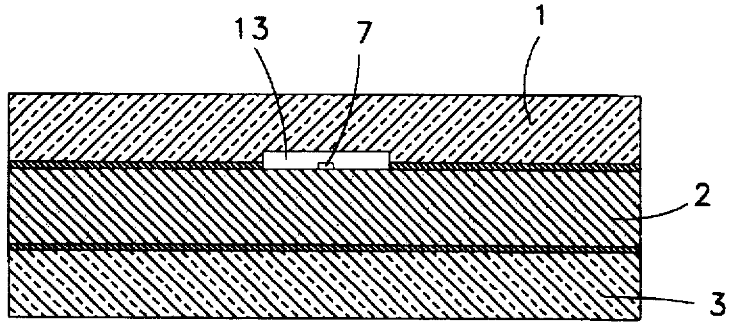

The microvalve of the present invention as shown in FIGS. 1, 2, 3A, 3B and 3C essentially comprises an upper layer 1, an intermediate layer 2 and a lower layer 3. The upper layer 1 is preferably formed of Pyrex glass. The intermediate layer 2 is provided with a platform-like suspension 22 and a thin bridge structure 23, which may be formed by silicon materials. Polysilicon is caused to accumulate on the intermediate layer 2 which is connected to a power source such that buckling deflection may occur when electric currents pass through the intermediate layer 2. The lower layer 3 may be formed of Pyrex glass as well, and nickel may be precipitated on a valve nozzle 32 to achieve good sealing effects for a valve seat 321.

Figure 2:
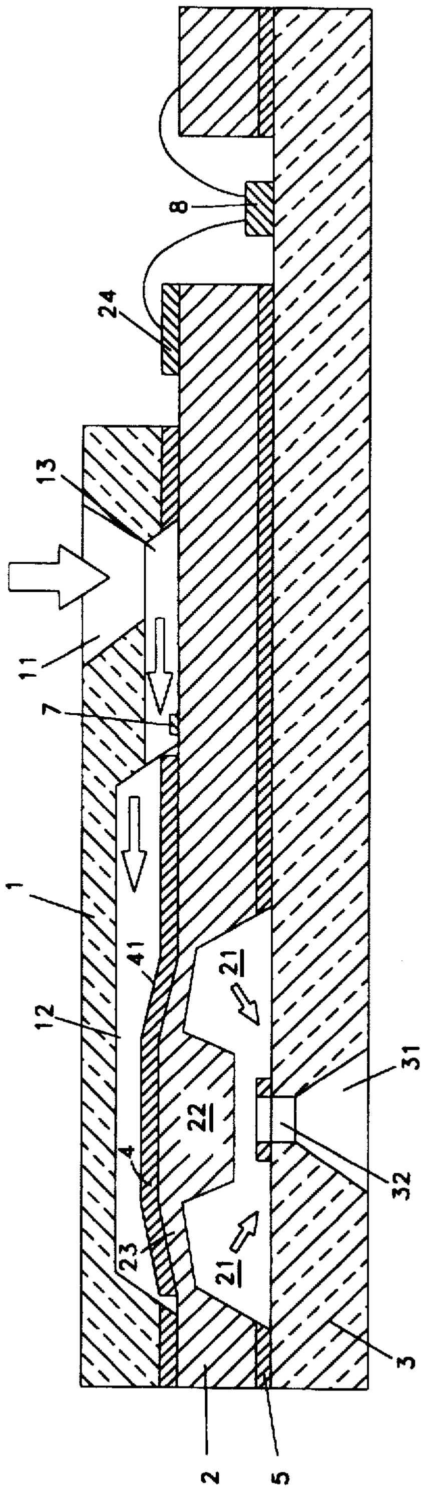
FIG. 2 is similar to FIG. 1, showing the valve nozzle in an opened state.

Fluid enters via an inlet of the upper layer 1 through a microflow channel 13 into a pressure chamber 12. When power is supplied, the suspension 22 and the bridge structures 23 deflect, as shown in FIG. 2, hence opening the valve nozzle 32 to allow fluid to flow out via an outlet 31 of the lower layer 3.

To illustrate, a preferred embodiment of the microvalve according to the present invention essentially comprises an upper layer 1 having an inlet 11 for entrance of a fluid, an electrically conductive intermediate layer 2 lying against a lower rim of the upper layer 1, the lower rim having a pressure distribution chamber 21, and a lower layer 3 lying against a lower rim of the intermediate layer 2 and having an outlet 31 for discharging the fluid, the outlet 31 communicating with the pressure distribution chamber 21 by means of a valve nozzle 32. A pressure chamber 12 is further disposed between the upper layer 1 and the intermediate layer 2. The pressure chamber 12 has a microflow channel 13 communicating with the inlet 11 of the upper layer 1.

Figure 1C:
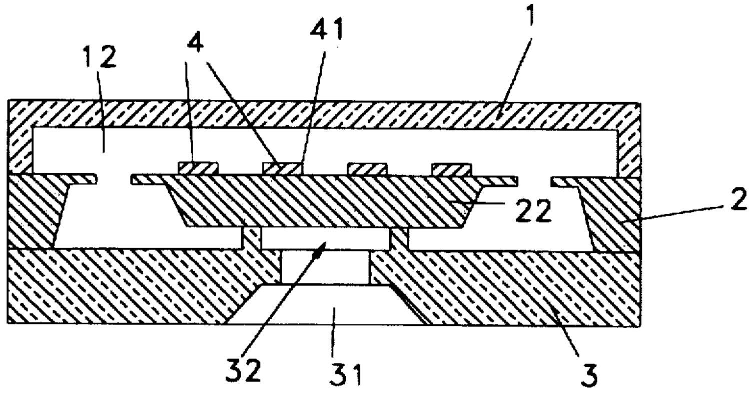
Figure 1D:
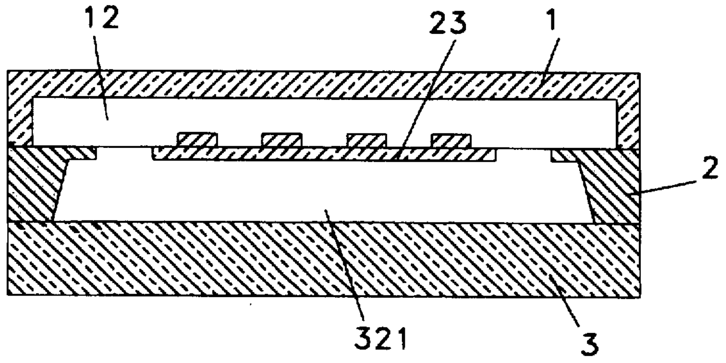
Figure 4:
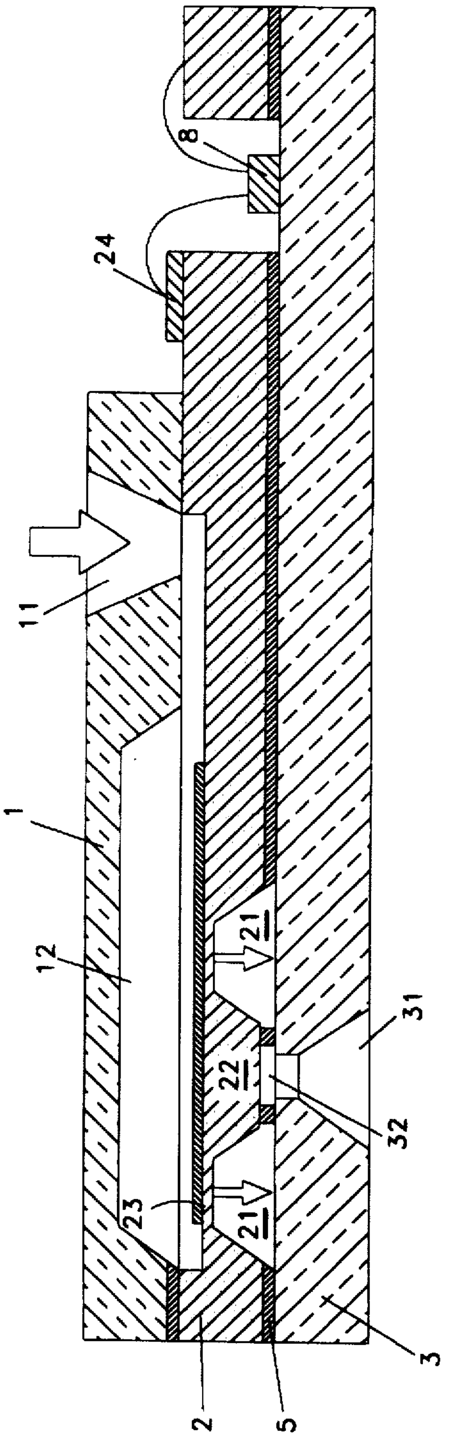
FIG. 4 is a sectional view of a second preferred embodiment of the microvalve of the present invention.

In the preferred embodiment shown in FIG. 1, the pressure chamber 12 and the microflow channel 13 are both arranged at the bottom rim of the upper layer 1. But as shown in FIG. 4, the microflow channel 13 may also be disposed at an upper rim of the intermediate layer, and the pressure chamber 12 may be comprised of a part of the bottom rim of the upper layer 1 and the upper rim of the intermediate layer 2. One side of the pressure chamber 12, as shown in Figs. 1C and 1D, communicates with the pressure distribution chamber 21 of the intermediate layer 2.

Figure 5:
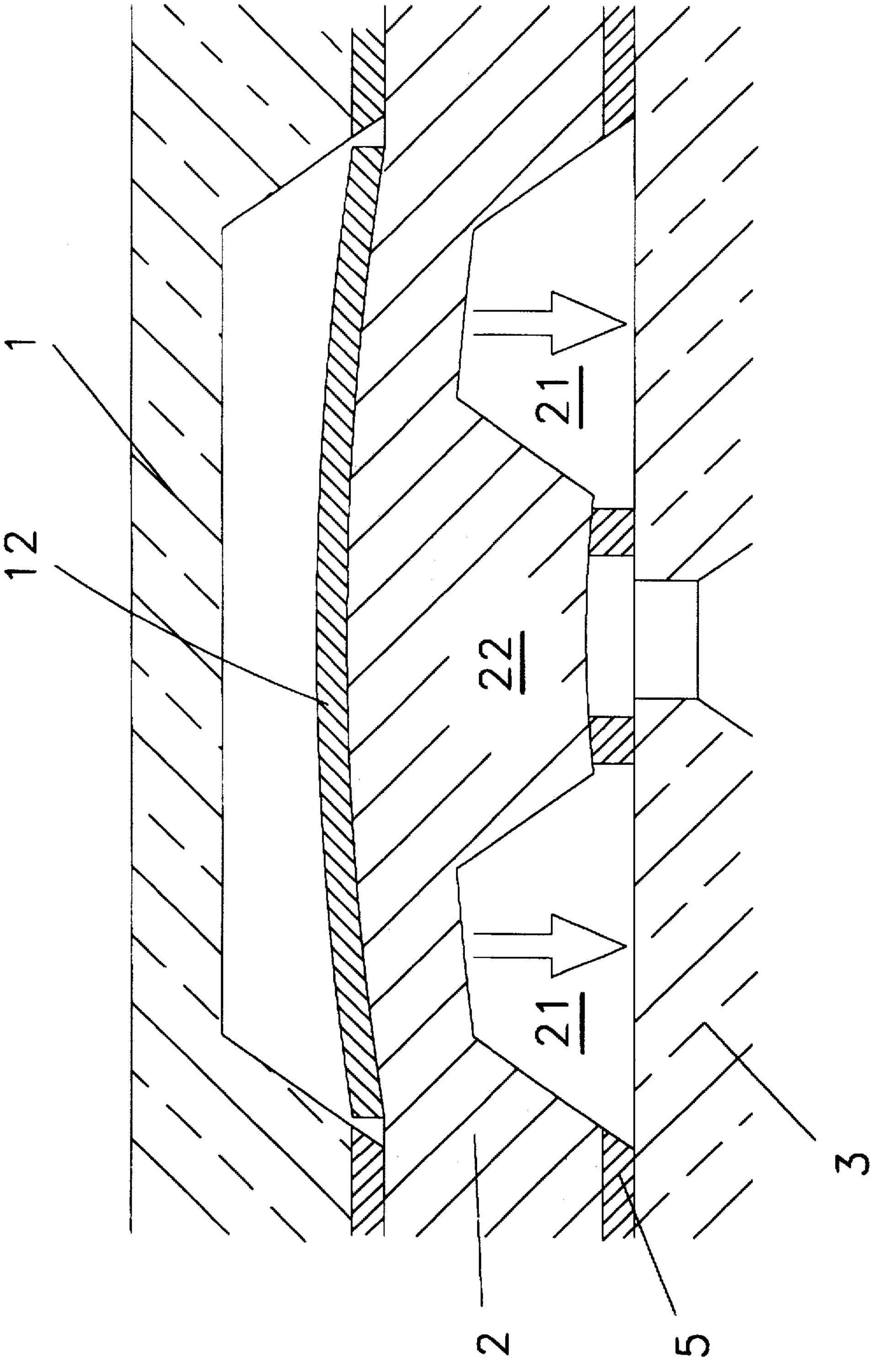
FIG. 5 is a partially enlarged sectional view of FIG. 1, showing a suspension curving upwardly.

A bottom wall region of the pressure chamber 12 has a part thereof forming a platform-like suspension 22 located above the valve nozzle 32. The suspension 22, as shown in FIG. 1, at least has both its sides each provided with a thin bridge structure 23. An upper side of the suspension 22 is provided with an electrical thermal membrane 4 for providing thermal buckling deflection effects. In addition, the valve nozzle 32 has a raised continuous valve seat 321 fitting tightly with the bottom rim of the suspension 22. As shown in FIG. 5, the suspension 22 is always maintained in an upwardly facing and slightly curved state. When the microvalve closes, due to the fact that the total area covered by the suspension 22 in the pressure chamber 12 and its bridge structures 23 is always greater than that of the lower sides of the bridge structures 23, and that the pressure chamber 12 is associated with the pressure distribution chamber 21, and under the condition that the pressures in these two chambers are equivalent, there is naturally a vertically downward action on the suspension 22, causing the valve nozzle 32 at its lower rim to always close. When the microvalve opens, the upper and lower action areas are equal, so that the pressure will not affect the actuation characteristics (as the deflection of the membrane 4 is due entirely to thermal deflection).

Additionally, in order to prevent gas from having a direct impact on the bridge structures 23, the inlet 11 is designed face away from the bridge structures 23 and gas is conducted via the microflow channel 13 into the pressure chamber 12 of the upper layer 1 to thereby render a relatively small impact on the bridge structures 23. By means of this arrangement, the microvalve according to the present invention may stand a greater fluid pressure.

Figure 8:
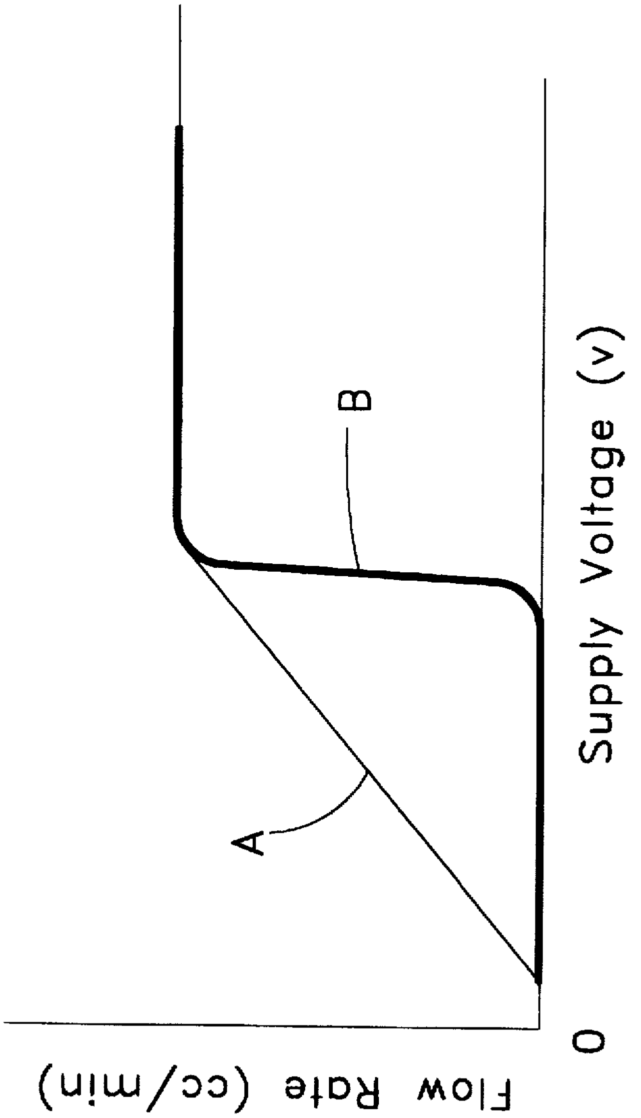
FIG. 8 is a graph showing the state of the microvalve when it is supplied with electricity and opens.

Furthermore, as mentioned above, those parts of the suspension 22 extending to the bridge structures 23 are con figured to curve slightly and face upwardly. Therefore, when the thermal membrane 4 is supplied with electric currents and generates the thermal buckling deflection, the valve nozzle 32 may, as represented by a curve A in FIG. 8, gradually open linearly, unlike the deflection caused by conventional thermal buckling represented by a curve B, in which sudden deflection occurs when thermal expansion reaches a critical degree.

Preferably, an electrically insulating membrane 5 is disposed where the intermediate layer 2 lies against the upper layer 1 or the lower layer 3. On the thermal membrane 4, it is preferable to dispose a suitable insulating protective membrane 41 which is resistant to acids or bases, according to the type of fluid, so that the thermal membrane 4 will not be easily damaged or electricity leakage may occur.

Figure 3A:
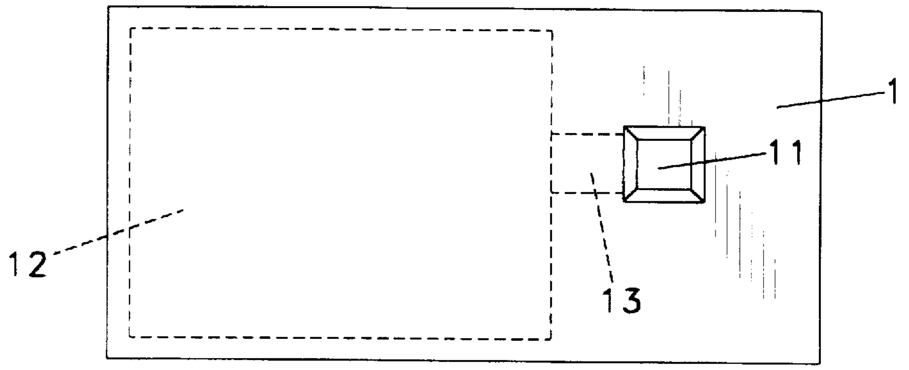
FIGS. 3A, 3B and 3C are respective top plan views of the three layers of the microvalve of the present invention.
Figure 3B:
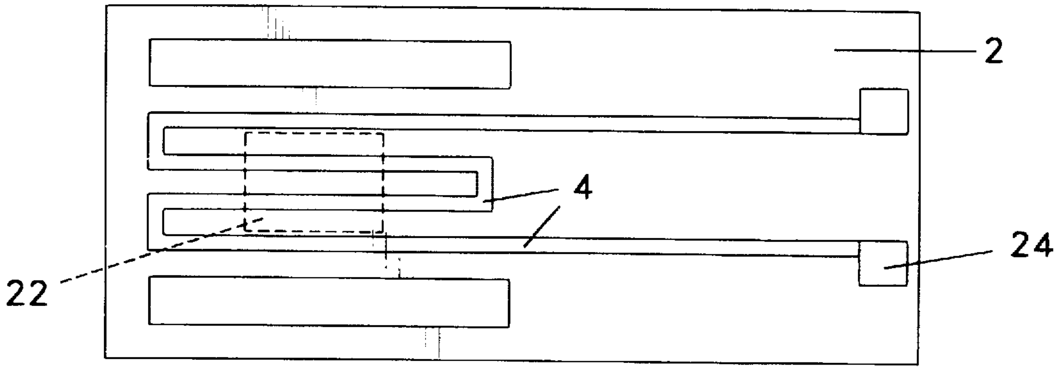
Figure 3C:
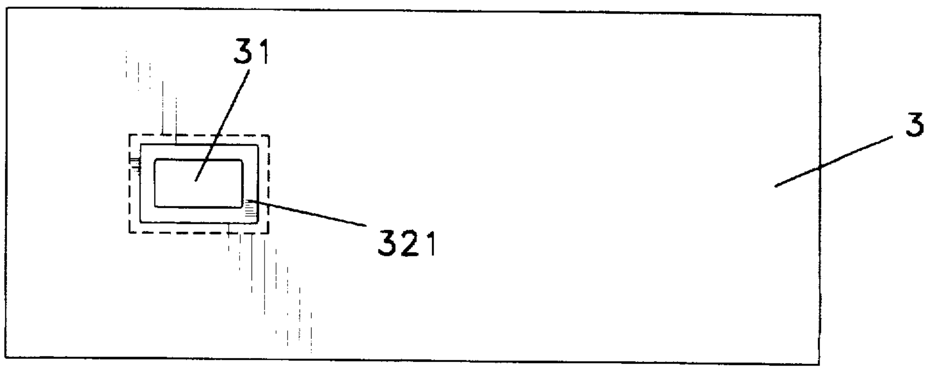
Figure 6B:
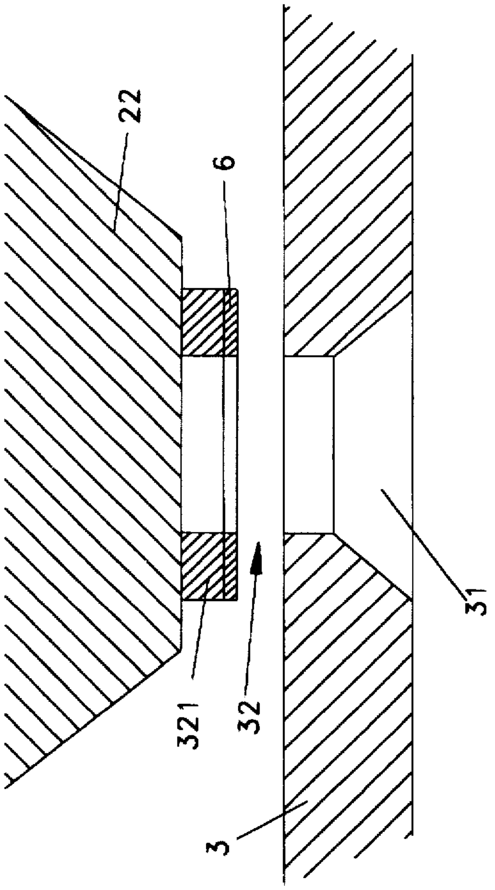
FIGS. 6A and 6B are respective partially enlarged views of the valve nozzle in FIG. 1, but showing two different preferred embodiments thereof.
Figure 6A:
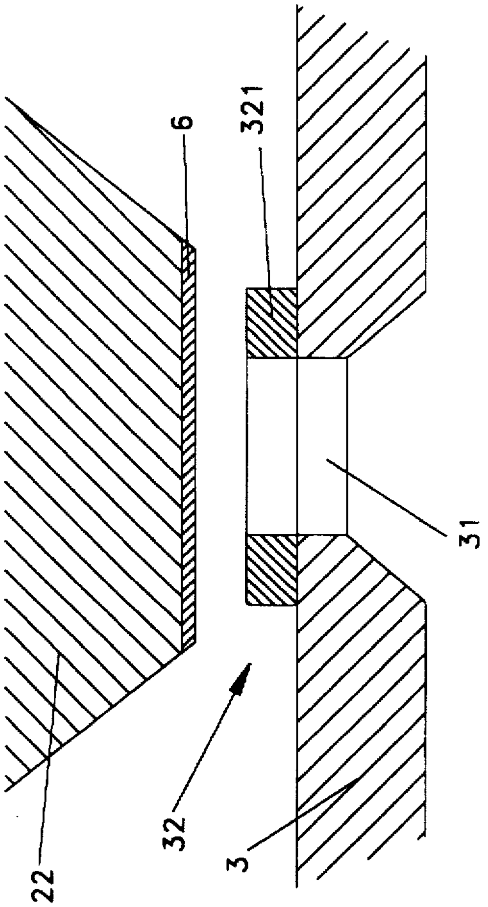

Referring to FIGS. 1 and 3C, the valve seat 321 is preferably a quadrilateral metal structure. The valve seat 321 may be located at the bottom rim of the suspension 22, as shown in FIG. 6A, or at an upper rim near the outlet 31 of the lower layer 3, as shown in FIG. 6B. A thin pad 6, such as silicon, is preferably disposed between the valve seat 321 and the bottom rim of the suspension 22 to enhance their tightness, as shown in FIG. 6A. Alternatively, the pad 6 may be disposed on the valve seat 321 as shown in FIG. 6B.

Figure 7:
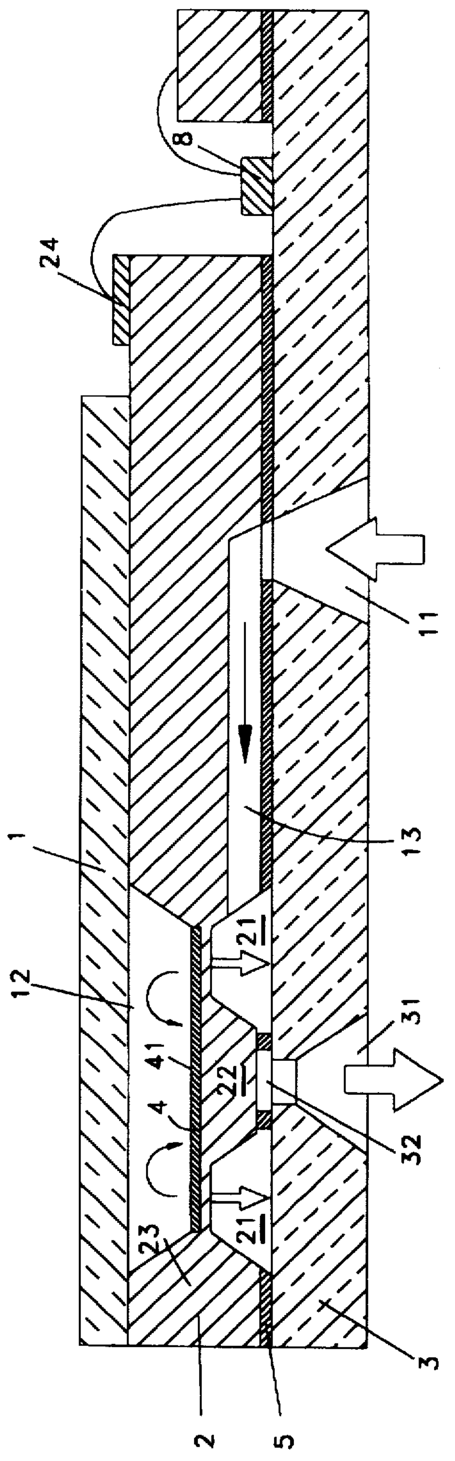
FIG. 7 is a sectional view of a third preferred embodiment of the microvalve of the present invention.

The microvalve according to the present invention may further comprise a microswitch 7 or micro flow sensor in the microflow channel 13. In addition, as shown in FIG. 1, the intermediate layer 2 may extend to the right to have a bonding pad 243 for securing an integrated circuit 8. Another preferred embodiment of the present invention is shown in FIG. 7. The fluid inlet 11 may also be disposed at the lower layer 3 and be connected via the microflow channel 13 at the bottom rim of the intermediate layer 2 to the pressure distribution chamber 21 and the pressure chamber 12. In this design, as the etched microflow channel is located at the intermediate layer 2, the difficulty of etching may be reduced.

With the present invention, the microvalve may have linear characteristics to control flow and may withstand a greater fluid pressure, thus its performance is enhanced. Therefore, it may be adapted for use on large flow valves to replace conventional solenoid valves.

Although the present invention has been illustrated and described with reference to the preferred embodiments thereof, it should be understood that it is in no way limited to the details of such embodiments, but is capable of numerous modifications within the scope of the appended claims.

What is claimed is:

1. A thermally buckling control microvalve, comprising:

an upper layer having an inlet for entrance of a fluid;

an electrically conductive intermediate layer lying against a lower rim of said upper layer, a lower rim of one end of said intermediate layer having a pressure distribution chamber;

a lower layer lying against a lower rim of said intermediate layer and having a fluid outlet at one end, said outlet communicating with said pressure distribution chamber via a valve nozzle; and a pressure chamber disposed between said upper layer and said intermediate layer and having one side communicating with said pressure distribution chamber of said intermediate layer, said pressure chamber communicating with said inlet of said upper layer via a microflow channel and said pressure chamber having a bottom wall region with a part thereof forming a suspension which is located at a region above said valve nozzle, said suspension having at least two sides each being provided with a thin bridge structure, an upper side of said suspension being provided with an electrical thermal membrane which may deflect as a result of thermal buckling when said intermediate layer is supplied with electric currents;

said valve nozzle having a raised continuous valve seat sealing tightly with the bottom rim of said suspension, causing said suspension to always be maintained in an upwardly facing and slightly curved state along its length.

2. The microvalve according to claim wherein said valve seat is located at a bottom side of said suspension.

3. The microvalve according to claim 1, wherein the total area of the upper side of said intermediate layer in said pressure chamber, corresponding to said suspension and said bridge structures, is greater than the total area of a lower side of said bridge structure.

4. The microvalve according to claim 1, wherein said microflow channel has a microswitch disposed therein.

5. The microvalve according to claim 1, wherein said valve seat is located at an upper side near said outlet of said lower layer.

6. The microvalve according to claim 1, wherein said microflow channel has a micro flow sensor disposed therein.

7. A thermally buckling control microvalve, comprising:

an upper layer;

an electrically conductive intermediate layer lying against a lower rim of said upper layer, a lower rim of one end of said intermediate layer having a pressure distribution chamber communicating with a microflow channel;

a lower layer lying against a lower rim of said intermediate layer and having an end with an inlet for entrance of a fluid with the other end having a fluid outlet, said outlet communicating with said pressure distribution chamber via a valve nozzle; and a pressure chamber disposed between said upper layer and said intermediate layer and communicating with said inlet of said lower layer via said microflow channel, one side of said pressure chamber communicating with said pressure distribution chamber of said intermediate layer, a bottom wall region under said pressure chamber having a part thereof forming a suspension which is located at a region above said valve nozzle, said suspension having at least two sides each having a thin bridge structure, and an upper side of said suspension being provided with an electrical thermal membrane which may deflect as a result of thermal buckling when said intermediate layer is supplied with electric currents;

said valve nozzle having a raised continuous valve seat sealing tightly with the bottom rim of said suspension, causing said suspension to always be maintained in an upwardly facing and slightly curved state along its length.

8. The microvalve according to claim 7, wherein said valve seat is located at a bottom side of said suspension.

9. The microvalve according to claim 7, wherein the total area of the upper side of said intermediate layer in said pressure chamber, corresponding to said suspension and said bridge structures, is greater than the total area of a lower side of said bridge structure.

10. The microvalve according to claim 7, wherein said microflow channel has a microswitch disposed therein.

11. The microvalve according to claim 7, wherein said valve seat is located at an upper side near said outlet of said lower layer.

12. The microvalve according to claim 7, wherein said microflow channel has a micro flow sensor disposed therein.

* * * * *